United States Patent [19]

Iljunin et al.

[11] 4,093,514

[45] June 6, 1978

[54] METHOD OF BRINGING NUCLEAR POWER PLANT TO FRACTIONAL ELECTRICAL LOAD CONDITIONS

[76] Inventors: Vladimir Grigorievich Iljunin, ulitsa Migunova, 9, kv. 28; Igor Alexeevich Kuznetsov, ulitsa Solnechnaya, 5, kv. 2; Viktor Mikhailovich Murogov, prospekt Lenina, 13/1, kv. 4, all of Obninsk, Kaluzhskoi oblasti; Anatoly Nikolaevich Shmelev, Novorogozhskaya ulitsa, 4, kv. 7, Moscow, all of U.S.S.R.

[21] Appl. No.: 770,773

[22] Filed: Feb. 22, 1977

Related U.S. Application Data

[63] Continuation of Ser. No. 586,802, Jun. 13, 1975, abandoned, which is a continuation of Ser. No. 406,215, Oct. 15, 1973, abandoned.

[51] Int. Cl.² .................................................. G21C 15/16
[52] U.S. Cl. ........................................ 176/65; 176/30; 176/60; 60/644
[58] Field of Search ................ 176/20, 30, 60, 65; 60/644, 676

[56] References Cited

U.S. PATENT DOCUMENTS

| 3,162,581 | 12/1964 | Brunner | 176/65 X |
|---|---|---|---|
| 3,164,527 | 1/1965 | Brunner | 176/60 X |
| 3,212,986 | 10/1965 | Pennington | 176/54 X |
| 3,240,678 | 3/1966 | Hemmerle et al. | 176/65 X |
| 3,359,174 | 12/1967 | Helbling | 176/65 X |
| 3,410,091 | 11/1968 | Frutschi | 176/65 X |
| 3,788,944 | 1/1974 | Strack et al. | 176/60 |
| 3,910,818 | 10/1975 | Sofer | 176/30 X |

FOREIGN PATENT DOCUMENTS

1,040,713   10/1958   Germany ................................ 176/60

*Primary Examiner*—Peter A. Nelson
*Attorney, Agent, or Firm*—Holman & Stern

[57] ABSTRACT

A method of bringing a nuclear power plant to fractional electric load conditions, which power plant comprises at least two nuclear reactors, at least one nuclear reactor being a breeder and both reactors transferring heat to the turbine working substance, consisting in that the consumption of the turbine working substance is reduced in accordance with a predetermined fractional load. At the same time, the amount of heat being transferred from the nuclear reactors to the turbine working substance is reduced, for which purpose the reactors are included in autonomous cooling circuits to successively transfer heat to the turbine working substance. The breeding reactor is included in the cooling circuit with a lower coolant temperature, the temperature of the coolant at the inlet and outlet of the breeder being reduced to a level ensuring the operation of the nuclear power plant in predetermined fractional load conditions, due to which the power of the breeder is increased, and afterheat is removed.

4 Claims, 6 Drawing Figures

METHOD OF BRINGING NUCLEAR POWER PLANT TO FRACTIONAL ELECTRICAL LOAD CONDITIONS

This is a continuation of application Ser. No. 586,802 filed June 13, 1975 which in turn is a continuation of application Ser. No. 406,215 filed Oct. 15, 1973, both abandoned.

BACKGROUND OF THE INVENTION

The present invention relates generally to nuclear power plants, and more particularly it relates to methods of bringing a nuclear power plant to fractional electric load conditions.

A method is known of bringing a nuclear power plant to fractional electric load conditions, consisting of two fast reactors arranged in parallel in the cooling circuit and transferring heat to the turbine working substance, consisting in that both the consumption of the working substance and the amount of heat being transferred from the reactors to the working substance are reduced in accordance with a predetermined fractional load. Therewith, the reduction of the amount of heat being transferred to the working substance is attained by decreasing the power of one of the reactors and by reducing the rate of flow of the coolant therethrough so that the coolant parameters at the inlet and outlet of the reactors are maintained constant.

A disadvantage of the known method resides in that when the power plant is being brought to fractional electric load conditions, the power of one of the reactors is reduced, which results in a lower rate of breeding new fuel, as well as in a lower energy content of the nuclear fuel being used.

SUMMARY OF THE INVENTION

It is an object of the present invention to provide a method of bringing a nuclear power plant to fractional electric load conditions, wherein a reduction in the amount of heat being transferred from the nuclear reactors to the turbine working substance will bring about an increase in the thermal capacity of the breeding reactor rather than a decrease therein, which, in turn, will result in a higher rate of breeding new fuel.

This object is attained by the fact that in a method of bringing a nuclear power plant to fractional electric load conditions, which power plant comprises two nuclear reactors, one reactor being a breeder and both reactors transferring heat to the turbine working substance, consisting in that the comsumption of the working substance and the amount of heat being transferred from the reactors to the working substance are reduced in accordance with a predetermined fractional electric load, the nuclear reactors are, according to the invention, included in autonomous cooling circuits to successively transfer heat to the turbine working substance, the breeding reactor being included in the cooling circuit with a lower coolant temperature, the temperature of the coolant at the inlet and outlet of the breeder being reduced to a level ensuring the operation of the power plant in predetermined fractional load conditions, due to which the power of the breeder is increased, after-heat being removed.

It is expedient that in the proposed method of bringing a nuclear power plant to fractional electric load conditions, part of the coolant be taken from the outlet of the reactor included in the cooling circuit with a higher coolant temperature and used for heating the coolant at the outlet of the breeder, and, in so doing, such an amount of heat should be removed from this portion of coolant that its temperature is brought down to the level of the coolant temperature at the inlet of the reactor included in the cooling circuit with a higher coolant temperature, then this portion of the coolant should be mixed with the coolant at the inlet of the reactor included in the cooling circuit with a higher coolant temperature.

It is also expedient that part of the coolant from the outlet of the reactor included in the cooling circuit with a higher coolant temperature be taken and used for heating the coolant at the outlet of the breeder, and, in so doing, the maximum possible amount of heat should be removed from this portion of coolant, then this same portion of coolant should be used for heating the turbine working substance in the steam generator with such an amount of heat being removed from this portion that its temperature is brought down to the level of the coolant temperature at the inlet of the reactor included in the cooling circuit with a higher coolant temperature, and, finally, this portion of coolant should be mixed with the coolant at the inlet of the reactor included in the cooling circuit with a higher coolant temperature.

Besides, it is desirable that part of the coolant be taken from the outlet of the reactor included in the cooling circuit with a higher coolant temperature to be mixed with the coolant at the outlet of the breeder and the resulting flow of coolant be used for heating the turbine working substance in the steam generator, and, in so doing, such an amount of heat should be removed from the resulting flow of coolant that its temperature be brought down to the level of the coolant temperature at the inlet of the reactor included in the cooling circuit with a higher coolant temperature, then the original portion of coolant should be taken from the resulting flow to be mixed with the coolant at the inlet of the reactor included in the cooling circuit with a higher coolant temperature.

It is also possible in the proposed method to take part of the coolant from the outlet of the reactor included in the cooling circuit with a higher coolant temperature and use it for heating the turbine working substance in the steam generator with such an amount of heat being removed from this portion of coolant that its temperature be brought down to the level of the coolant temperature at the inlet of the reactor included in the cooling circuit with a higher coolant temperature, then to mix this portion of coolant with the coolant at the inlet of the reactor included in the cooling circuit with a higher coolant temperature.

The method of bringing a nuclear power plant to fractional electric load conditions, according to the present invention, is advantageous in that it offers a higher rate of breeding secondary nuclear fuel with the power plant operating in fractional electric load conditions.

BRIEF DESCRIPTION OF THE DRAWINGS

The invention will now be described in greater detail with reference being made to specific embodiments thereof in conjunction with the accompanying drawings, wherein.

DETAILED DESCRIPTION OF THE PREFERRED EMBODIMENT

Figure 1:
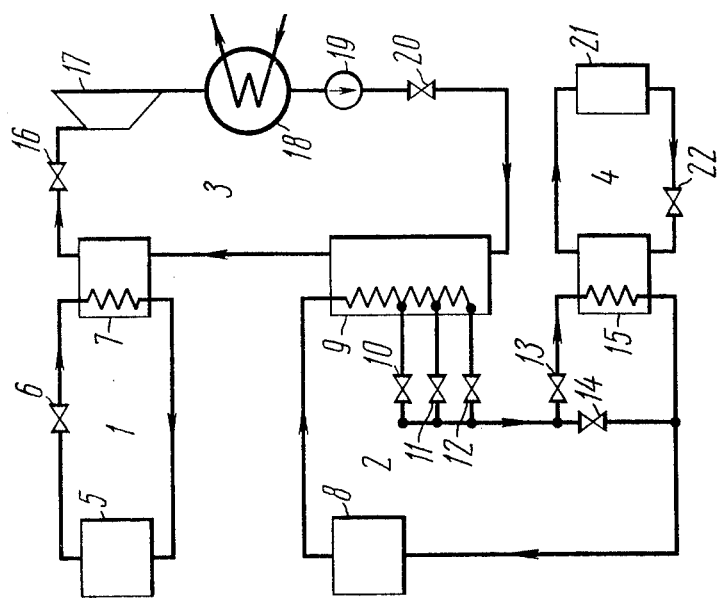
FIG. 1 is a simplified diagram of an embodiment of a nuclear power plant for effecting the method of bringing a nuclear power plant to fractional electric load conditions, according to the invention.

Referring now to FIG. 1, the nuclear power plant comprises a high-temperature cooling circuit 1, a low-temperature cooling circuit 2, a working substance circuit 3 and a heat-consuming circuit 4.

The high-temperature cooling circuit 1 includes a high-temperature reactor 5, adjusting fittings 6 and a steam superheater 7, all arranged in series.

The low-temperature cooling circuit 2 includes a low-temperature breeding reactor 8, a steam generator 9, adjusting fittings 10, 11, 12, 13, 14 and a heat exchanger 15, all arranged in series.

The working substance circuit 3 includes the steam generator 9, the steam superheater 7, turbine adjusting fittings 16, a steam turbine 17, a condenser 18, pumps 19 and adjusting fittings 20, all arranged in series.

The heat-consuming circuit 4 includes the heat exchanger 15, a heat consumer 21 and adjusting fittings 22, all arranged in series.

The steam generator 9 is so made that its heat-transfer surface has a plurality of sections on the side of the coolant outflow, which sections can be shut off by means of the adjusting fittings 10, 11, 12 with the result that the heat-transfer area of the generator 9 can be reduced so as to enable the coolant to be taken from precisely that point of the steam generator 9 whereat the coolant temperature corresponds to a particular electric load of the nuclear power plant.

Used as the high-temperature reactor 5 is a sodium-cooled oxide-fuelled reactor. The high-temperature reactor may also be gas- or steam-cooled.

Used as the low-temperature breeding reactor 8 is a fast breeder, preferably fuelled with monocarbide or any other metal fuel. Use may also be made of a thermal breeder operating in a thorium cycle.

Figure 2:
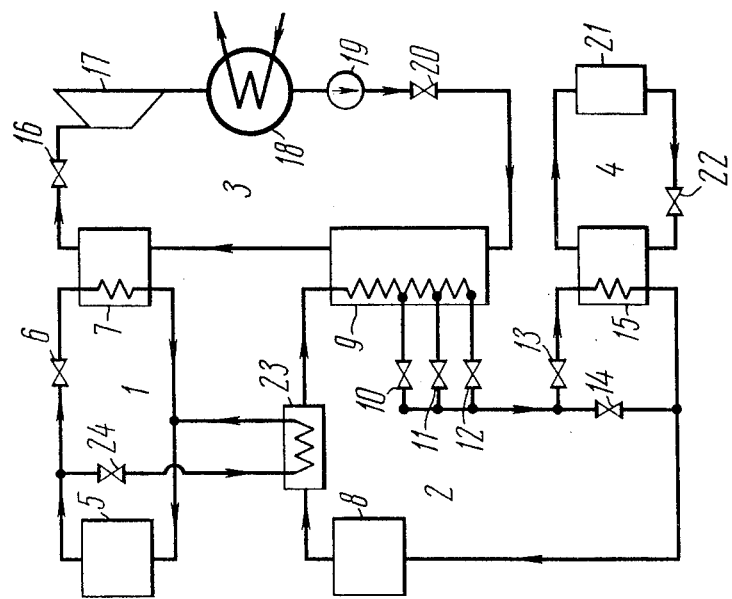
FIG. 2 is a simplified schematic representation of another embodiment of a nuclear power plant for effecting the method of the present invention.

FIG. 2 shows another embodiment of the nuclear power plant for effecting the method of the invention, which differs from the power plant of FIG. 1 in that an auxiliary heat exchanger 23 of the regenerative type arranged in series with additional adjusting fittings 24 are placed in the high-temperature cooling circuit 1 in parallel with the steam superheater 7. In this arrangement, the heat exchanger 23 is disposed in the circuit 1 on the side of the heating coolant, while on the side of the heated coolant the auxiliary heat exchanger 23 is included in the low-temperature circuit 2 intermediate of the outlet of the breeding reactor 8 and the inlet of the steam generator 9.

Figure 3:
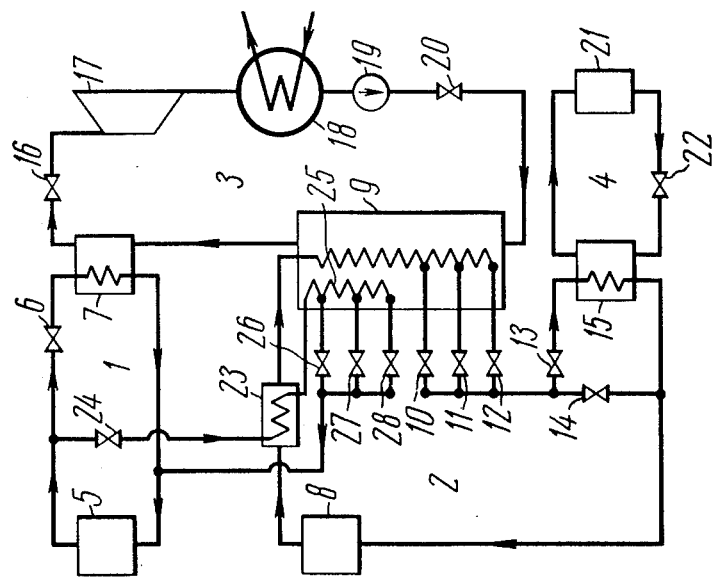
FIG. 3 is a simplified schematic representation of a third embodiment of a nuclear power plant for effecting the method of the present invention.

The third embodiment of the nuclear power plant for effecting the method of the present invention, shown in FIG. 3, differs from the power plant of FIG. 2 in that an auxiliary section 25 of the steam generator 9 together with adjusting fittings 26, 27 and 28 are arranged intermediate of the outlet of the auxiliary heat exchanger 23, on the side of the heating coolant, and the inlet of the high-temperature reactor 5.

The auxiliary section 25 of the steam generator 9 comprises an additional sectionalized heat-transfer area wherethrough heat is transferred from part of the coolant of the high-temperature reactor 5 to the working substance. Therewith, this heat-transfer area is so disposed in the steam generator that the coolant of the high-temperature reactor 5 flows in one direction parallel to the main flow of the coolant in the circuit 2 and its temperature is at each point equal to that at respective points of the main coolant flow.

The adjusting fittings 26, 27 and 28 are arranged so as to tap the coolant from different points of the auxiliary section 25 in accordance with the electric load of the nuclear power plant.

Figure 4:
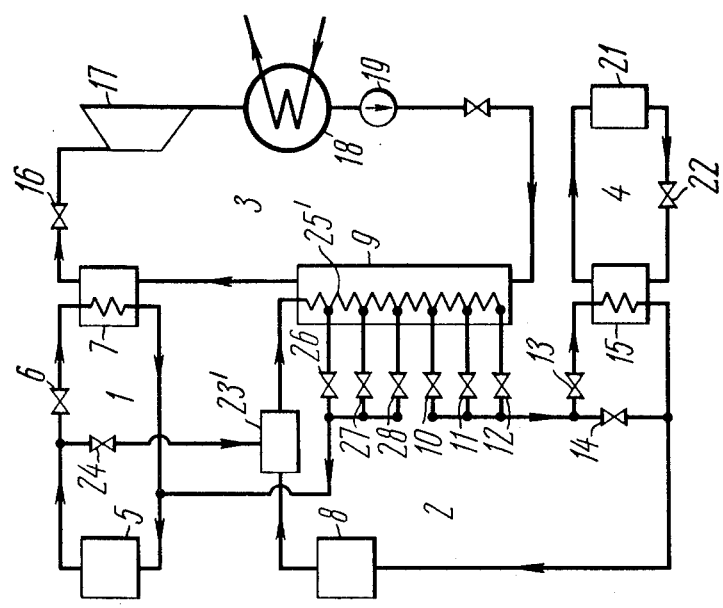
FIG. 4 is a simplified schematic representation of a fourth embodiment of a nuclear power plant for effecting the method of the present invention.

Shown in FIG. 4 is the fourth embodiment of the nuclear power plant for effecting the method of the present invention, which differs from the power plant of FIG. 3 in that used as the auxiliary heat exchanger is a contact heat exchanger 23', and used as the auxiliary section 25 is the initial portion 25' of the main heat-transfer area of the steam generator 9.

Figure 5:
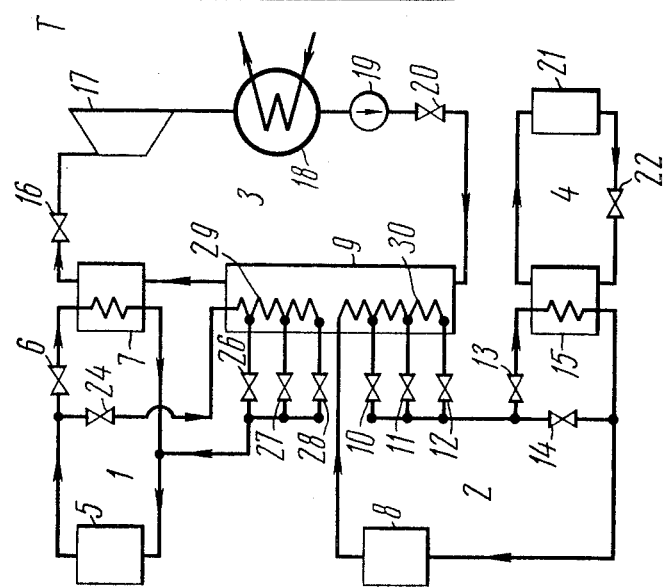
FIG. 5 is a simplified schematic representation of a fifth embodiment of a nuclear power plant for effecting the method of the present invention.

FIG. 5 illustrates the fifth embodiment of the nuclear power plant for effecting the method of the present invention, which differs from the embodiment of FIG. 1 in that the heat-transfer area of the steam generator 9 is divided into two independent sections 29 and 30. The section 29 with a higher coolant temperature may be placed in parallel with the steam superheater 7 by means of the adjusting fittings 24, 26, 27 and 28, and the section 30 with a lower coolant temperature may be included in the low-temperature cooling circuit 2 in a manner like this is done in the nuclear power plant of FIG. 1. Therewith, the high-temperature section 29 is sectionalized which makes it possible to tap the coolant, by means of the fittings 26, 27 and 28, from that point of the high-temperature section 29 at which the coolant temperature corresponds to a particular electric load of the nuclear power plant.

Figure 6:
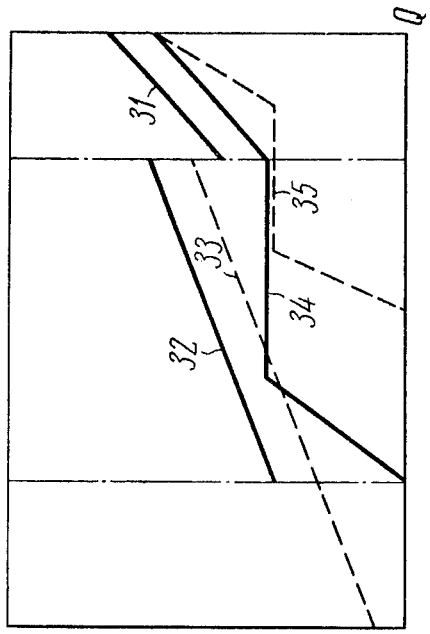
FIG. 6 is a graph representing the temperatures (T) of the coolant and the working substance versus the amount of heat (Q) being transferred from the coolant to the working substance (TQ-diagram) for the embodiment of the nuclear power plant of FIG. 2, according to the invention.

Plotted on the abscissa of the TQ-diagram of FIG. 6 is the amount of heat (Q) being transferred from the coolant to the working substance, while the temperatures (T) of the coolant and the working substance are plotted as ordinates.

Curve 31 represents variations in the temperature of the coolant of the high-temperature reactor 5 when the nuclear power plant operates in the rated and fractional electric load conditions, respectively, as heat is being transferred from the coolant to the working substance in the steam superheater 7.

Curves 32 and 33 represent variations in the temperature of the coolant of the low-temperature breeding reactor 8 when the nuclear power plant operates in the rated and fractional electric load conditions, respectively, as heat is being transferred from the coolant to the working substance in the steam generator 9 and heat exchanger 15.

Curves 34 and 35 represent variations in the temperature of the working substance of the turbine 17 when the nuclear power plant operates in the rated and fractional electric load conditions, respectively, as the temperature is rising in the steam generator 9 and steam superheater 7.

The above-described embodiments of the method according to the present invention can be realized to the best advantage at two-circuit nuclear power plants. So far as three-circuit power plants are concerned using, for example, fast liquid-metal fuel reactors in the first and intermediate circuits, the above embodiments should preferably be realized in the intermediate circuit with heat exchangers being arranged between the first and intermediate circuits.

The method of bringing a nuclear power plant to fractional electric load conditions, according to the present invention, is realized as follows.

When the electric load of a nuclear power plant is reduced, the consumption of the working substance is at the same time being brought down by means of the adjusting fittings 16 and 20 (FIG. 1) so as to maintain the parameters (pressure and rate of flow) of the working substance upstream of the turbine 17 invariable.

At the same time, a portion of the heat-transfer area of the steam generator 9 on the side of the coolant outflow therefrom is shut off in the circuit 2 of the low-temperature breeding reactor 8 with the aid of the fittings 10, 11 and 12, thus reducing the amount of heat being transferred from the breeder 8 to the working substance to match the reduction of the electric load of the power plant. Therewith, the adjusting fittings 13 and 14 are used to introduce the heat exchanger 15 into the circuit 2 of the low-temperature breeding reactor 8, and the fittings 22 are used to hook the heat consumer 21 into the circuit thereby removing the heat which is in excess of the amount needed for the operation of the nuclear power plant in the fractional electric load conditions.

The introduction of the heat exchanger 15 results in a substantial reduction in the coolant temperature both at the inlet and oulet of the low-temperature breeding reactor 8 and a respective increase in the thermal capacity thereof.

At the same time, the flow rate of the coolant through the breeder 8 is maintained invariable.

In the embodiment of FIG. 2, to bring the power plant to fractional electric load conditions, the coolant from the output of the high-temperature reactor 5 is additionally distributed by means of the fittings 6 and 24 so that a portion thereof, required to heat the turbine working substance to the preset temperature, is directed to the steam superheater 7. The remaining portion of the coolant is diverted to the auxiliary heat exchanger 23 of the regenerative type in which heat from this portion of the coolant from the high-temperature reactor 5 is transferred to the coolant at the outlet of the low-temperature breeding reactor 8, whereafter said portion of coolant is sent back to the inlet of the high-temperature reactor 5.

The accomplishment of the above-described steps in this particular embodiment culminates in the processes illustrated by the TQ-diagram of FIG. 6 (curves 31 to 35).

In the embodiment of FIG. 3, in addition to what has been done in the embodiment of FIG. 1, part of the coolant from the high-temperature reactor 5 is delivered to the auxiliary heat exchanger 23, in which case this portion of coolant serves as a heating medium, then, after heat has been transferred therefrom, in the auxiliary heat exchanger 23, to the coolant of the low-temperature breeding reactor 8, it is delivered further to the auxiliary section 25 of the steam generator 9, wherein such an amount of heat is transferred from this portion of coolant to the turbine working substance that the coolant temperature is brought down to the level of that at the inlet of the high-temperature reactor 5. Thereafter, the adjusting fittings 26, 27 and 28 are used to tap this portion of coolant from that point of the auxiliary section 25 downstream, whereat the coolant temperature is equal to that at the inlet of the high-temperature reactor 5 and corresponds, at the same time, to a particular fractional electric load of the nuclear power plant; this portion of coolant is delivered to the inlet of the high-temperature reactor 5.

In the embodiment of FIG. 4, additionally to the steps of bringing the power plant to fractional electric load conditions as effected in the embodiment of FIG. 1, the coolant from the outlet of the high-temperature reactor 5 is distributed by means of the fittings 6 and 24 so that a portion thereof required to maintain a predetermined temperature of the working substance of the turbine 17 operating in fractional electric load conditions is directed to the steam superheater 7. The remaining portion of the coolant is diverted to the auxiliary contact heat exchanger 23' wherein it is mixed with the coolant coming from the outlet of the low-temperature breeding reactor 8. The resulting total flow of the coolant is directed to the steam generator 9 in which it is cooled as heat is being transferred to the turbine working substance. Then, the previously added portion of coolant is tapped from the total flow by means of the fittings 26, 27 and 28, from that point of the heat-transfer area of the steam generator 9, downstream, whereat the temperature of the total coolant flow becomes equal to the coolant temperature at the inlet of the high-temperature reactor 5 and corresponds, at the same time, to a particular fractional electric load of the nuclear power plant, and delivered to the inlet of the high-temperature reactor 5.

In the embodiment of FIG. 5, in addition to the steps effected in the embodiment of FIG. 1, part of the coolant from the outlet of the high-temperature reactor 5 is delivered to the inlet of the high-temperature section 29 of the steam generator 9, in which such an amount of heat is transferred from this portion of coolant to the turbine working substance that the temperature of the coolant is brought down to the level of that at the inlet of the high-temperature reactor 5. Then, the adjusting fittings 26, 27 and 28 are used to tap a portion of the coolant from that point of the high-temperature section 29, downstream, whereat the coolant temperature becomes equal to that at the inlet of the high-temperature reactor 5 and corresponds, at the same time to a particular fractional electric load of the nuclear power plant, and deliver this portion to the inlet of the high-temperature reactor 5.

The realization of the proposed method at a nuclear power plant having a rated electric capacity of 3,000 MW and comprising two reactors: a high-temperature sodium oxide-fuelled fast reactor and a low-temperature sodium metal-fuelled fast reactor, with their thermal capacities being in the ratio of about 0.3 to 0.7 (in proportion to the superheat section-to-economizer-cum-evaporator section ratio), the minimum coolant temperature downstream of the heat exchanger 15 being equal to some 100° C and the steam parameters upstream of the turbine being: T = 505° C, P = 130 atm, offers, the nuclear power plant operating at half its rated electric capacity, an increase in the fuel breeding rate in the fuel cycle by 30 to 40%. The doubling period of the low-temperature reactor is reduced by about 20% (from 3.7 to about 3.0 years).

What is claimed is:

1. A method of bringing a nuclear power plant to fractional electric load conditions, which nuclear power plant comprises a turbine driven by a working substance, at least two nuclear reactors, at least one nuclear reactor being a breeder and both reactors transferring heat to said working substance, said method comprising the steps of: reducing the supply of working substance to said turbine in accordance with a predetermined fractional load; transferring heat successively from said nuclear reactors to said working substance; connecting said breeding reactor to a first cooling circuit having a first coolant temperature; connecting the other nuclear reactor to a second cooling circuit with a coolant temperature higher than said first coolant temperature; lowering the coolant temperature at the inlet and outlet of said breeding reactor to a level corresponding to the reduced supply of said and increasing the power of said breeding reactor as a result of the lowering of the temperature of the coolant flowing therethrough; and removing excess heat resulting therefrom.

2. A method of bringing a nuclear power plant to fractional electric load conditions as claimed in claim 1, and further including the steps of taking a portion of the coolant from the outlet of said other reactor connected in said second cooling circuit with the higher coolant temperature; using said portion of coolant for heating said working substance of said turbine with such an amount of heat being removed from said portion of coolant that the temperature thereof is brought down to the level of the coolant temperature at the inlet of said other reactor connected in said second cooling circuit with the higher coolant temperature; and then mixing said portion of coolant with the coolant at the inlet of said other reactor connected in said second cooling circuit with the higher coolant temperature.

3. A method of bringing a nuclear power plant to fractional electric load conditions as claimed in claim 1, and further including the steps of taking a portion of the coolant from the outlet of said reactor connected in said second cooling circuit with the higher coolant temperature; using said portion of coolant for heating the coolant at the outlet of said breeding reactor with the maximum possible amount of heat being removed from said portion of coolant; then using the same said portion of coolant for heating said working substance of said turbine with such an amount of heat being removed from said portion of coolant so that the temperature thereof is brought down to the level of the coolant temperature at the inlet of said other reactor connected in said second cooling circuit with the higher coolant temperature; and then mixing said portion of coolant with the coolant at the inlet of said other reactor connected in the cooling circuit with the higher coolant temperature.

4. A method of bringing a nuclear power plant to fractional electric load conditions as claimed in claim 1 and further including the steps of taking a portion of the coolant from the outlet of said other reactor connected in said second cooling circuit with the higher coolant temperature; mixing said portion of coolant with the coolant at the outlet of said breeding reactor; using the resulting total flow of coolant for heating said working substance of said turbine with such an amount of heat being removed from said total flow so that the tamperature thereof is brought down to the level of the coolant temperature at the inlet of said other reactor connected in the cooling circuit with the higher coolant temperature; and then taking the previously added portion of coolant from said total flow of coolant and mixing with the coolant at the inlet of said other reactor included in said second cooling circuit with the higher coolant temperature.

* * * * *